United States Patent
Sasaki et al.

(10) Patent No.: US 6,479,691 B1
(45) Date of Patent: Nov. 12, 2002

(54) CATALYST FOR PRODUCING UNSATURATED NITRILE

(75) Inventors: Yutaka Sasaki, Yokohama (JP); Kunio Mori, Yokohama (JP); Yoshimi Nakamura, Yokohama (JP); Takao Shimizu, Yokohama (JP); Yuichi Tagawa, Yokohama (JP); Kenichi Miyaki, Yokohama (JP); Seiichi Kawato, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/673,571

(22) PCT Filed: Apr. 22, 1999

(86) PCT No.: PCT/JP99/02146

§ 371 (c)(1),
(2), (4) Date: Oct. 18, 2000

(87) PCT Pub. No.: WO99/54037

PCT Pub. Date: Oct. 28, 1999

(30) Foreign Application Priority Data

Apr. 23, 1998 (JP) .......................... 10-128098
May 21, 1998 (JP) .......................... 10-155388
May 26, 1998 (JP) .......................... 10-159987

(51) Int. Cl.$^7$ .................. C07C 253/00; B01J 21/02; B01J 27/198; B01J 27/188; B01J 27/19
(52) U.S. Cl. .................. 558/321; 558/322; 558/323; 558/324; 502/205; 502/209; 502/210; 502/211; 502/212; 502/215; 502/241; 502/242; 502/243; 502/303; 502/304; 502/305; 502/306; 502/307; 502/308; 502/311; 502/312; 502/313; 502/314; 502/315; 502/316; 502/317; 502/319; 502/320
(58) Field of Search ................. 502/305, 306, 502/307, 308, 311, 312, 313, 314, 315, 316, 317, 321, 319, 104, 113, 205, 209, 210, 211, 212, 215, 241–243, 303, 304; 558/303, 320, 321–324

(56) References Cited

U.S. PATENT DOCUMENTS

| 3,226,422 A | | 12/1965 | Sennewald et al. | |
|---|---|---|---|---|
| 3,988,359 A | | 10/1976 | Saito et al. | |
| 4,083,804 A | * | 4/1978 | Saito et al. | ................. 252/432 |
| 4,290,922 A | | 9/1981 | Umemura et al. | |
| 4,370,279 A | * | 1/1983 | Sasaki et al. | ............. 260/465.3 |
| 4,587,226 A | * | 5/1986 | Sasaki et al. | .................. 502/5 |
| 4,590,173 A | * | 5/1986 | Sasaki et al. | ............... 502/204 |
| 4,709,070 A | * | 11/1987 | Sasaki et al. | ............... 558/322 |
| 4,774,352 A | * | 9/1988 | Sasaki et al. | ............... 558/422 |
| 4,826,802 A | * | 5/1989 | Sasaki et al. | ............... 502/206 |
| 4,978,765 A | * | 12/1990 | Sasaki et al. | ............... 558/324 |
| 5,059,573 A | * | 10/1991 | Sasaki et al. | ............... 502/205 |
| 5,071,814 A | * | 12/1991 | Sasaki et al. | ............... 502/205 |
| 5,093,299 A | | 3/1992 | Suresh et al. | |
| 5,094,990 A | * | 3/1992 | Sasaki et al. | ............... 502/214 |
| 5,132,269 A | | 7/1992 | Sasaki et al. | |
| 5,139,988 A | * | 8/1992 | Sasaki et al. | ............... 502/206 |
| 5,175,334 A | | 12/1992 | Suresh et al. | |
| 5,834,394 A | | 11/1998 | Chen et al. | |
| 5,877,381 A | * | 3/1999 | Sasaki et al. | ............... 585/658 |

FOREIGN PATENT DOCUMENTS

| CN | 1172261 A | 2/1998 |
|---|---|---|
| EP | 0 383 598 | 8/1990 |
| EP | 0 389 255 | 9/1990 |
| EP | 0484792 A1 | 5/1992 |
| JP | 38-19111 | 9/1921 |
| JP | 58-35160 | 3/1983 |
| JP | 7-47272 | 2/1995 |
| JP | 7-328441 | 12/1995 |
| JP | 2640356 | 5/1997 |

\* cited by examiner

*Primary Examiner*—Wayne A. Langel
*Assistant Examiner*—Cam N. Nguyen
(74) *Attorney, Agent, or Firm*—Fitch, Even, Tabin & Flannery

(57) ABSTRACT

A catalyst composition represented by the following empirical formula which is useful in production of unsaturated nitrites by ammoxidation:

$$Mo_{10}Bi_aFe_bSb_cNi_dCr_eF_fG_gH_hK_kX_xY_yO_i(SiO_2)_j$$

wherein F represents at least one element selected from the group consisting of zirconium, lanthanum and cerium, G represents at least one element selected from the group consisting of magnesium, cobalt, manganese and zinc, H represents at least one element selected from the group consisting of vanadium, niobium, tantalum and tungsten, x represents at least one element selected from the group consisting of phosphorus, boron, and tellurium, Y represents at least one element selected from the group consisting of lithium, sodium, rubidium and cesium, the suffixes a-k, x and y represent a ratio of atoms or atomic groups, and a=0.1–3, b=0.3–15, c=0–20, d=3–8, e=0.2–2, f=0.05–1, e/f>1, g=0–5, h=0–3, k=0.1–1, x=0–3, y=0–1, i is the number of oxygen produced by bonding of the above respective components, and j=0–100.

10 Claims, No Drawings

CATALYST FOR PRODUCING UNSATURATED NITRILE

This application is the national phase of international application PCT/JP99/02146 filed Apr. 22, 1999 which designated the U.S.

TECHNICAL FIELD

The present invention relates to a metal oxide catalyst used in production of unsaturated nitriles by ammoxidation.

PRIOR ART

Hitherto, various compositions of catalysts have been disclosed as catalysts suitable for production of unsaturated nitriles by ammoxidation, for example, production of acrylonitrile by ammoxidation of propylene, production of methacrylonitrile by ammoxidation of isobutylene or tertiary buthanol, etc. For example, U.S. Pat. No. 3,226,422 discloses oxide catalysts containing molybdenum, bismuth and iron, and JP-B-38-19111 discloses oxide catalysts containing iron and antimony. Thereafter, improvement of the catalysts have been intensively attempted, and, for example, U.S. Pat. No. 4,290,922 discloses oxide catalysts containing molybdenum, cobalt, nickel, bismuth, vanadium, calcium and potassium as essential components and zirconium and/or chromium as optional components, Japanese Pat. No. 2640356 discloses oxide catalysts containing molybdenum, bismuth, iron, nickel and an alkali metal element, U.S. Pat. Nos. 5,093,299 and 5,175,334 disclose oxide catalysts containing molybdenum, bismuth, iron, nickel, magnesium, potassium and cesium, JP-A-7-47272 discloses oxide catalysts containing at least one element selected from the group consisting of molybdenum, bismuth, iron, nickel, chromium and indium and an alkali metal element such as potassium as essential components and at least one element selected from the group consisting of manganese, magnesium, zinc, cerium, sodium and phosphorus as optional components, JP-A-7-328441 discloses oxide catalysts containing molybdenum, bismuth, cerium, iron, nickel and magnesium or zinc, and an alkali metal, U.S. Pat. No. 5,132,269 discloses oxide catalysts containing iron, antimony, molybdenum and bismuth or tellurium, and potassium.

These catalysts of the prior art have some effects for improvement in the yield of unsaturated nitrites, but the improvement is still insufficient. In this technical field, it has been desired that yield of unsaturated nitrites is further increased and, besides, combustion of ammonia which often occurs in the case of using catalysts higher in molybdenum content is inhibited to reduce production of by-products such as nitrogen oxide which causes problems in the protection of environment.

DISCLOSURE OF THE INVENTION

As a result of intensive research conducted by the inventors in an attempt to solve the above problems in the prior art, it has been found that in the catalysts containing molybdenum, bismuth, iron, antimony, etc., coexistence of chromium and at least one element selected from the group consisting of zirconium, lanthanum and cerium results in high yields of unsaturated nitrites which cannot be attained with addition of the elements each alone.

These additive elements give synergistically favorable effects. Titanium and hafnium which belong to the same group as zirconium did not show such effects. Rare earth metal elements of the lanthanum group other than lanthanum and cerium also did not show such special effects.

Chromium and at least one element selected from the group consisting of zirconium, lanthanum and cerium show clear effects with addition of them in relatively small amounts, and addition in excess amount rather causes sharp reduction of the yield of the desired products. Furthermore, in the addition of them, the lower proportion of zirconium, lanthanum and cerium to chromium is preferred, and increase of the proportion results in increase of ammonia combustion and reduction of the yield of the desired products. By using in combination chromium and at least one element selected from the group consisting of zirconium, lanthanum and cerium and by finding the preferred relation in the amounts of them in addition, yield of the desired products can be improved and, besides, combustion of ammonia can be inhibited and yield of by-products can be reduced.

That is, the present invention provides a catalyst composition represented by the following empirical formula which is used in production of unsaturated nitriles by ammoxidation.

$Mo_{10}Bi_aFe_bSb_cNi_dCr_eF_fG_gH_hK_kX_xY_yO_i(SiO_2)_j$

In the above formula, Mo, Bi, Fe, Sb, Ni, Cr and K represent molybdenum, bismuth, iron, antimony, nickel, chromium and potassium, respectively, F represents at least one element selected from the group consisting of zirconium, lanthanum and cerium, G represents at least one element selected from the group consisting of magnesium, cobalt, manganese and zinc, H represents at least one element selected from the group consisting of vanadium, niobium, tantalum and tungsten, X represents at least one element selected from the group consisting of phosphorus, boron and tellurium, Y represents at least one element selected from the group consisting of lithium, sodium, rubidium and cesium, O represents oxygen and $SiO_2$ represents silica, the suffixes a, b, c, d, e, f, g, h, i, j, k, x and y represent a ratio of atoms or atomic groups, and in the case of Mo=10, a=0.1, b=0.3–15, c=0–20, d=3–8, e=0.2–2, f=0.05–1, e/f>1, g=0–5, h=0–3, k=0.1–1, x=0–3, y=0–1, number of oxygen produced by bonding of the above respective components, and j=0–100.

On the other hand, efforts have been made for increasing yield of the desired oxidation products by improving preparation method of catalysts. For example, U.S. Pat. No. 3,350,323 discloses a method of adding an aqueous bismuth citrate solution to an aqueous molybdic acid solution, JP-A-53-10387, JP-A-53-10388 and U.S. Pat. No. 3,847,831 disclose methods of adding a bismuth compound in solid state to an aqueous molybdic acid solution, U.S. Pat. No. 4,418,007 discloses a method of simultaneously adding an aqueous solution of a bismuth salt and aqueous ammonia to an aqueous molybdic acid solution having a pH of 6–8, U.S. Pat. No. 4,388,226 discloses a method of adding an aqueous solution of a bismuth salt to a suspension of a molybdenum compound, U.S. Pat. Nos. 4,212,766, 4,148,757 and 4,040,978 disclose methods of previously forming various molybdates, JP-B-52-22359 and U.S. Pat. No. 3,872,148 disclose methods of previously forming various bismuth compounds, U.S. Pat. No. 4,803,190 discloses a method of using bismuth oxide or bismuth oxycarbonate as a bismuth source, JP-A-2-59046 discloses a method of adjusting pH of a slurry containing at least one element selected from the group consisting of iron, bismuth and tellurium and a molybdenum compound to higher than 7, U.S. Pat. No. 5,059,573 discloses a method of adding a chelating agent to a molybdenum compound-containing slurry containing silica to adjust pH to 6 or higher, and U.S. Pat. No. 5,071,814 discloses a method of adjusting a slurry containing molybdenum to a pH of 6 or higher and then mixing a bismuth compound therewith.

As mentioned above, various methods have been proposed for attaining improvement of catalyst performance, such as devising the method of mixing aqueous molybdenum solution with bismuth compound or special selection of starting materials for bismuth. However, when these methods are applied to production of molybdenum-bismuth-containing composite oxide catalysts containing at least one metallic element selected from the group consisting of divalent metallic elements and trivalent metallic elements, yield of the desired oxidation products is not necessarily satisfactory.

BEST MODE FOR CARRYING OUT THE INVENTION

Molybdenum, bismuth, iron, nickel, chromium, potassium and the metallic element represented by F are essential components, and unless they are within the above compositional ranges, the object of the present invention cannot be attained.

When the catalyst composition of the present invention contains iron antimonate, it naturally contains antimony, and in this case, there are advantages that, for example, especially, selectivity of the desired product is improved and physical properties of the catalyst are also improved.

Moreover, when the catalyst of the present invention is used as a fluidized bed catalyst, silica is preferably used as a carrier and in this case, j=20–80 is a preferred range.

The catalyst composition of the present invention can be prepared by suitably selecting the preparation methods disclosed as conventional techniques.

Molybdenum oxide, ammonium paramolybdate, etc. are used as starting materials for the molybdenum component; bismuth trioxide, bismuth nitrate, bismuth carbonate, bismuth oxalate, etc. are used as starting materials for bismuth component; iron nitrate, iron oxalate, etc. are used as starting materials for the iron component; chromium nitrate, chromic acid, etc. are used as starting materials for the chromium component; and potassium hydroxide, potassium nitrate, etc. are used as starting materials for the potassium component.

Moreover, zirconium oxide, zirconium oxynitrate, etc. are used as starting materials for the zirconium component; lanthanum oxide, lanthanum nitrate, etc. are used as starting materials for the lanthanum component; and cerium oxide, ammonium cerium nitrate, etc. are used as starting materials for the cerium component. In addition, organic acid salts of these elements can also be used.

As starting materials for components such as nickel, cobalt, magnesium, manganese and zinc, it is convenient to use nitrates thereof, but organic acid salts, hydroxides and oxides thereof can also be used.

In the case of adding a tellurium component, telluric acid or salts thereof or tellurous acid or salts thereof can be used as starting materials of the tellurium component, and, besides, a solution prepared by dissolving metallic tellurium in a heated aqueous hydrogen peroxide may also be used.

As starting materials for other components, oxides, hydroxides, nitrates, organic acid salts, etc. of the elements are used.

As starting materials for silica, silica sols, fumed silica, etc. are used, and silica sols are especially preferred. As silica sols, it is preferred to use those of low sodium content.

The catalyst composition of the present invention is prepared by mixing these starting materials, drying the mixture, and calcining it, and it is preferred to adjust the slurry prepared by mixing the starting materials to have a pH of 6 or higher. By this operation, ammonia combustibility at the time of reaction is reduced, and yield of the desired product is improved. In this case, the operability can be improved by adding a chelating agent to the slurry to lower viscosity of the slurry. When the catalyst composition of the present invention with a pH of 6 or higher is prepared, it has been found that presence of chromium component contributes to lowering of viscosity of the slurry. This is advantageous for improving operability and is to be noticed.

Further heat treatment of the prepared slurry is sometimes useful because stability of the slurry increases and reproducibility is improved.

The chelating agents usable here include ethylenediaminetetraacetic acid, lactic acid, citric acid, tartaric acid and gluconic acid.

Amount of the chelating agents added is preferably 0.1–10% by weight, more preferably 0.5–8% by weight based on the weight of the oxide catalyst produced. If the amount of the chelating agents is less than 0.1% by weight based on the oxide catalyst, the effect is not sufficiently developed, and if it is more than 10% by weight, the resulting catalyst is sometimes cracked considerably. In preparation of a solution containing iron ion and chelating agent, amount of the chelating agent is preferably 0.1–2 gram molecule per 1 gram ion of iron.

In the case of containing iron antimonate, preferably the iron antimonate is previously prepared and then mixed with the starting materials for molybdenum and other components to form a slurry.

As further improved preparation methods, preferred is a method which comprises mixing an aqueous slurry having a pH of 6 or higher and containing at least a part of the starting material for molybdenum and the starting material for at least one element selected from the group consisting of nickel, cobalt, magnesium, chromium, manganese and zinc with a solution or slurry containing the starting material for tellurium and/or the starting material for iron, and drying and calcining the mixture. Especially, in the case of a catalyst containing both tellurium and iron, preferred is a method which comprises mixing a solution or slurry containing the starting material for iron, a solution containing the starting material for tellurium and said aqueous slurry having a pH of 6 or higher or mixing a mixed solution or slurry containing the starting material for iron and the starting material for tellurium with said aqueous slurry having a pH of 6 or higher, and then drying and calcining the mixture.

Another preferred method comprises heat treating an aqueous slurry having a pH of 6 or higher and containing at least a part of the starting material for molybdenum and the starting material for at least one element selected from the group consisting of nickel, cobalt, magnesium, chromium, manganese and zinc at a temperature of 50–120° C., preferably 60–120° C. for at least 10 minutes, thereafter mixing the starting material for tellurium or the starting material for iron or both the starting materials for tellurium and iron with said heat treated slurry, and then drying and calcining the mixture.

As the starting materials for iron, there may be used ferrous oxide, ferric oxide, tri-iron tetroxide, ferrous nitrate, ferric nitrate, iron sulfate, iron chloride, organic acid salts of iron, iron hydroxide, etc. Moreover, a solution obtained by dissolving metallic iron in heated nitric acid may also be used. The solution containing the iron component may be used with adjusting the pH with aqueous ammonia or the like. In adjusting the pH, precipitation of the iron component can be prevented by allowing a chelating agent to coexist in the solution containing the iron component, and highly active catalysts can be obtained. The chelating agents usable here include, for example, ethylenediaminetetraacetic acid, lactic acid, citric acid, tartaric acid and gluconic acid.

In the above methods, it is preferred to carry out drying of the slurry mixture by a spray drying method and carry out granulation simultaneously with the drying in the case of producing fluidized bed catalysts. In this way, fine spherical particles can be obtained.

After drying, said mixture is preferably calcined at 200–500° C. and further calcined at 500–700° C. The calcining time can be 1–20 hours. The atmosphere in calcining is preferably oxygen-containing gas. The calcining is conveniently carried out in the air, but can also be carried out in the atmosphere of suitable mixture with oxygen and nitrogen, carbon dioxide, water vapor, organic compounds, etc. Box-type kiln, tunnel kiln, rotary kiln, fluidization kiln, etc. can be used for the calcining. In the case of the catalyst being a fluidization bed catalyst, it is especially preferred to carry out the final calcination by a fluidization kiln. Thus, severe control of the final calcination conditions can be easily performed, and fluidized bed catalysts of excellent performances can be produced with satisfactory reproducibility. The particle diameter of the thus produced fluidized bed catalysts is preferably 10–200 $\mu$m.

The catalyst compositions of the present invention or the catalyst compositions produced by the method of the present invention are suitable for production of unsaturated nitriles by ammoxidation of olefins.

The ammoxidation reaction is usually carried out using a supply gas having the composition in the range of starting organic compound/ammonia/air=1/0.9–1.3/8–12 (molar ratio) at a reaction temperature of 370–500° C. and a reaction pressure of normal pressures to 500 kPa. The apparent contact time is 0.1–20 seconds.

The present invention will be explained in more detail by the following examples.

Activity Test of Catalysts

Ammoxidation of propylene was carried out as an example of ammoxidation reaction.

The catalyst was packed in a fluidized bed type reactor of 400 mm in height and 25 mm in inner diameter of catalyst fluidization part, and a mixed gas having the composition of propylene/ammonia/air/water vapor=1/1.2/10/0.5 (molar ratio) was supplied into the reactor at a gas linear speed of 4.5 cm/sec. The reaction pressure was 200 kPa.

Contact time (sec)=volume (ml) of the catalyst based on apparent bulk density/flow rate (ml/sec) of the supplied gas calculated in terms of reaction conditions.

Yield of acrylonitrile (%)=the number of mols of the produced acrylonitrile/the number of mols of the supplied propylene×100.

Selectivity of acrylonitrile (%)=the number of mols of the produced acrylonitrile/the number of mols of the consumed propylene×100.

Conversion of propylene (%)=the number of mols of the consumed propylene/the number of mols of the supplied propylene×100.

Combustion rate of ammonia (%)=100 [(weight of nitrogen in the product+weight of nitrogen in the residual ammonia)/weight of nitrogen in the supplied ammonia×100]

EXAMPLE 1-1

A catalyst having the composition of $Mo_{10}Bi_{0.3}Fe_{4.4}Sb_{4.2}Ni_{5.75}Cr_{0.5}Zr_{0.2}K_{0.7}P_{0.2}Te_{0.25}O_{53.7}$ $(SiO_2)_{40}$ (atomic ratio) was prepared.

250.6 g of ammonium paramolybdate was dissolved in 1730 g of pure water, and, then, 3.3 g of 85% phosphoric acid was added to the solution. The resulting solution was mixed with 1750 g of 20% silica sol. This solution was mixed with a solution obtained by dissolving, in 216 g of 3.3% nitric acid, 243.7 g of nickel nitrate, 29.16 g of chromium nitrate, 7.79 g of zirconium oxynitrate, 10.32 g of potassium nitrate, 40 g of citric acid, 35.33 g of iron nitrate and 21.21 g of bismuth nitrate, and thus a slurry was obtained. To this slurry was added a solution obtained by adding to 208 g of water, 4.65 g of metallic tellurium, 3.9 g of ammonium paramolybdate and 16 g of aqueous hydrogen peroxide, followed by stirring at 95–100° C. to dissolve the components. To this slurry with stirring was added 15% aqueous ammonia to adjust the pH to 7.7, and this slurry was mixed with 138.3 g of an iron antimonate powder to obtain a mixture.

Said mixture was spray dried by a rotary disk type spray dryer with an inlet temperature of 330° C. and an outlet temperature of 160° C. The particles were heat treated at 250° C. for 2 hours and at 400° C. for 2 hours, and finally calcined in a fluidization kiln at 590° C. for 3 hours.

EXAMPLE 1-2

A catalyst having the same composition as of Example 1-1 was prepared by the following method.

154.4 g of ammonium paramolybdate was dissolved in 1730 g of pure water, and, then, 3.3 g of 85% phosphoric acid was added to the solution. The solution was mixed with 1750 g of 20% silica sol. This solution was mixed with a solution obtained by dissolving, in 216 g of 3.3% nitric acid, 243.7 g of nickel nitrate, 29.16 g of chromium nitrate, 7.79 g of zirconium oxynitrate, 10.32 g of potassium nitrate, 20 g of citric acid and 21.21 g of bismuth nitrate, and thus a slurry was obtained. To this slurry with stirring was added 15% aqueous ammonia to adjust the pH to 7.7, and then the slurry was heat treated at 100° C. for 1.5 hour under refluxing.

To 208 g of water were added 4.65 g of metallic tellurium, 3.9 g of ammonium paramolybdate and 16 g of aqueous hydrogen peroxide, followed by stirring at 95–100° C. to dissolve the components. This solution was cooled to room temperature, and 20 g of citric acid and 35.33 g of iron nitrate were dissolved therein. 15% aqueous ammonia was added to the resulting solution with stirring to adjust the pH to 9.2, and, further, 99.1 g of ammonium paramolybdate was added thereto little by little and dissolved. Then, aqueous ammonia was added to adjust the pH to 7. This solution was mixed with the above heat treated slurry and mixed with 138.3 g of an iron antimonate powder.

The resulting mixture was spray dried and heat treated in the same manner as in Example 1-1, and finally calcined in a fluidization kiln at 580° C. for 3 hours.

EXAMPLE 2-1

A catalyst having the composition of $Mo_{10}Bi_{0.3}Fe_{4.5}Sb_7Ni_{5.75}Cr_{0.7}La_{0.2}V_{0.05}K_{0.7}P_{0.2}Te_{0.25}O_{59.8}$ $(SiO_2)_{40}$ (atomic ratio) was prepared by the following method.

237.2 g of ammonium paramolybdate was dissolved in 1730 g of pure water, and, then, 3.10 g of 85% phosphoric acid was added to the solution. The solution was mixed with 1615 g of 20% silica sol. This solution was mixed with a solution obtained by dissolving, in 210 g of 3.3% nitric acid, 224.6 g of nickel nitrate, 37.6 g of chromium nitrate, 11.63 g of lanthanum nitrate, 9.51 g of potassium nitrate, 40 g of citric acid, 32.56 g of iron nitrate and 19.55 g of bismuth nitrate, and thus a slurry was obtained. To this slurry with stirring was added 15% aqueous ammonia to adjust the pH to 7.7, and then the slurry was heat treated at 100° C. for 1.5 hour under refluxing.

7.71 g of telluric acid was dissolved in 200 g of pure water. This solution was mixed with the above heat treated slurry and mixed with 186.4 g of an iron antimonate powder.

The resulting mixture was spray dried and heat treated in the same manner as in Example 1-1, and finally calcined in a fluidization kiln at 590° C. for 3 hours.

EXAMPLE 2-2

A catalyst having the same composition as of Example 2-1 was prepared by the following method.

237.2 g of ammonium paramolybdate was dissolved in 1730 g of pure water, and then 3.10 g of 85% phosphoric acid was added to the solution. The resulting solution was mixed with 1615 g of 20% silica sol. This solution was mixed with a solution obtained by dissolving, in 216 g of 3.3% nitric acid, 224.6 g of nickel nitrate, 37.6 g of chromium nitrate, 11.63 g of lanthanum nitrate, 9.51 g of potassium nitrate, 20 g of citric acid and 19.55 g of bismuth nitrate, and thus a slurry was obtained. To this slurry with stirring was added 15% aqueous ammonia to adjust the pH to 7.7, and then the slurry was heat treated at 100° C. for 1.5 hour under refluxing.

7.71 g of telluric acid, 20 g of citric acid and 32.56 g of iron nitrate were dissolved in 200 g of water. This solution was mixed with the above heat treated slurry and mixed with 186.4 g of an iron antimonate powder.

The resulting mixture was spray dried and heat treated in the same manner as in Example 1-1, and finally calcined in a fluidization kiln at 590° C. for 3 hours.

EXAMPLE 3

A catalyst having the composition of $Mo_{10}Bi_{0.4}Fe_{4.5}Sb_{10}Ni_{5.75}Cr_{1.0}Ce_{0.2}Ta_{0.05}K_{0.5}P_{0.2}Cs_{0.1}O_{65.8}(SiO_2)_{40}$ (atomic ratio) was prepared by the following method.

219.2 g of ammonium paramolybdate was dissolved in 1730 g of pure water, and then 2.86 g of 85% phosphoric acid was added thereto. The resulting solution was mixed with 1490 g of 20% silica sol. This solution was mixed with a solution obtained by dissolving, in 210 g of 3.3% nitric acid, 207.6 g of nickel nitrate, 49.67 g of chromium nitrate, 10.78 g of cerium nitrate, 8.79 g of potassium nitrate, 2.42 g of cesium nitrate, 1.32 g of tantalum oxide, 20 g of citric acid and 21.21 g of bismuth nitrate, and thus a slurry was obtained. To this slurry with stirring was added 15% aqueous ammonia to adjust the pH to 7.7, and then the slurry was heat treated at 100° C. for 1.5 hour under refluxing.

20 g of citric acid and 35.33 g of iron nitrate were dissolved in 100 g of water. To this solution with stirring was added 15% aqueous ammonia to adjust the pH to 8. This solution was mixed with the above heat treated slurry and then mixed with 138.3 g of an iron antimonate powder.

The resulting mixture was spray dried and heat treated in the same manner as in Example 1-1, and finally calcined in a fluidization kiln at 600° C. for 3 hours.

EXAMPLE 4-1

A catalyst having the composition of $Mo_{10}Bi_{0.4}Fe_{0.6}Ni_{5.75}Cr_{0.5}Zr_{0.2}K_{0.7}P_{0.2}Te_{0.25}O_{39.8}(SiO_2)_{40}$ (atomic ratio) was prepared by the following method.

309.5 g of ammonium paramolybdate was dissolved in 1800 g of pure water, and then 4.04 g of 85% phosphoric acid was added thereto. This solution was mixed with a solution obtained by dissolving, in 250 g of 3.3% nitric acid, 293.2 g of nickel nitrate, 35.08 g of chromium nitrate, 9.37 g of zirconium oxynitrate, 12.41 g of potassium nitrate and 34.02 g of bismuth nitrate, followed by mixing with 2107 g of 20% silica sol, and thus a slurry was obtained. To this slurry with stirring was added 15% aqueous ammonia to adjust the pH to 8. To this slurry was added a solution obtained by dissolving 10.1 g of telluric acid and 35.33 g of iron nitrate in 200 g of pure water, followed by mixing them.

The resulting mixture was spray dried and heat treated in the same manner as in Example 1-1, and finally calcined in a fluidization kiln at 580° C. for 3 hours.

EXAMPLE 4-2

A catalyst having the same composition as of Example 4-1 was prepared by the following method.

185.7 g of ammonium paramolybdate was dissolved in 1730 g of pure water, and then 4.04 g of 85% phosphoric acid was added thereto. This solution was mixed with a solution obtained by dissolving, in 216 g of 3.3% nitric acid, 293.2 g of nickel nitrate, 35.08 g of chromium nitrate, 9.37 g of zirconium oxynitrate, 12.41 g of potassium nitrate, 24 g of citric acid and 34.02 g of bismuth nitrate, followed by mixing with 2107 g of 20% silica sol, and, as a result, a slurry was obtained. To this slurry with stirring was added 15% aqueous ammonia to adjust the pH to 7.7, and then the slurry was heat treated at 100° C. for 1.5 hour under refluxing.

To 208 g of pure water were added 5.59 g of a metallic tellurium powder, 4.6 g of ammonium paramolybdate, 19 g of 31% aqueous hydrogen peroxide and 19 g of water, followed by stirring and dissolving at 95–100° C. The solution was cooled to room temperature, and 20 g of citric acid and 35.33 g of iron nitrate were dissolved therein. To the solution with stirring was added 15% aqueous ammonia to adjust the pH to 9.2, then 119.2 g of ammonium paramolybdate was added thereto little by little, and furthermore 15% aqueous ammonia was added to adjust the pH to 7. This solution was added to the above heat treated slurry and these were mixed.

The resulting mixture was spray dried and heat treated in the same manner as in Example 1-3, and finally calcined in a fluidization kiln at 580° C. for 3 hours.

EXAMPLE 5

A catalyst having the composition of $Mo_{10}Bi_{0.4}Fe_{0.6}Ni_{5.75}Cr_{1.5}La_{0.2}Mn_{0.2}K_{0.7}P_{0.2}Te_{0.25}O_{41.6}(SiO_2)_{40}$ (atomic ratio) was prepared in accordance with the method of Example 4-2.

EXAMPLE 6

A catalyst having the composition of $Mo_{10}Bi_{0.8}Fe_{4.5}Sb_4Ni_{6.5}Cr_{0.6}Zr_{0.1}La_{0.1}K_{0.7}P_{0.5}B_{0.3}O_{55.8}(SiO_2)_{50}$ (atomic ratio) was prepared in accordance with the method of Example 1–2, except that the iron antimonate containing phosphorus and boron (at an atomic ratio of 0.075 to Sb, respectively) was used.

EXAMPLE 7

A catalyst having the composition of $Mo_{10}Bi_1Fe_{4.5}Sb_4Ni_6Cr_{0.5}Zr_{0.1}Zn_{0.2}Nb_{0.05}K_{0.6}P_{0.5}B_{0.3}Te_{0.25}O_{56.0}(SiO_2)_{50}$ (atomic ratio) was prepared in accordance with the method of Example 6.

EXAMPLE 8

A catalyst having the composition of $Mo_{10}Bi_1Fe_{4.5}Sb_4Ni_{5.5}Cr_{0.5}La_{0.1}Mg_{0.5}K_{0.6}P_{0.2}Te_{0.25}O_{54.5}(SiO_2)_{40}$ (atomic ratio) was prepared in accordance with the method of Example 1-2.

EXAMPLE 9

A catalyst having the composition of $Mo_{10}Bi_{1.5}Fe_{4.5}Sb_4Ni_5Cr_{0.3}La_{0.07}Co_1K_{0.6}P_{0.2}Te_{0.25}O_{55.3}(SiO_2)_{40}$ (atomic ratio) was prepared in accordance with the method of Example 1-2.

EXAMPLE 10

A catalyst having the composition of $Mo_{10}Bi_{0.4}Fe_{4.5}Sb_4Ni_7Cr_{0.4}La_{0.1}W_{0.1}K_{0.5}P_{0.5}B_{0.3}Rb_{0.1}O_{55.4}(SiO_2)_{40}$ (atomic ratio) was prepared in accordance with the method of Example 6.

EXAMPLE 11

A catalyst having the composition of $Mo_{10}Bi_{0.3}Fe_{7.6}Sb_{7.7}Ni_6Cr_{0.5}Zr_{0.1}La_{0.1}K_{0.6}P_{0.2}O_{65.5}(SiO_2)_{60}$ (atomic ratio) was prepared in accordance with the method of Example 1-2.

COMPARATIVE EXAMPLE 1

A catalyst having the composition of $Mo_{10}Bi_{0.3}Fe_{4.4}Sb_{4.2}Ni_{5.75}Zr_{0.2}K_{0.7}P_{0.2}Te_{0.25}O_{53.0}(SiO_2)_{40}$ (atomic ratio) was prepared in accordance with the method of Example 1-2, except that the zirconium component was not added.

COMPARATIVE EXAMPLE 2

A catalyst having the composition of $Mo_{10}Bi_{0.3}Fe_{4.4}Sb_{4.2}Ni_{5.75}Ce_{0.2}K_{0.7}P_{0.2}Te_{0.25}O_{55.4}(SiO_2)_{40}$ (atomic ratio) was prepared in accordance with the method of Example 1-2, except that the chromium component was not added.

COMPARATIVE EXAMPLE 3

A catalyst having the composition of $Mo_{10}Bi_{0.3}Fe_{4.4}Sb_{4.2}Ni_{5.75}Ce_{0.2}K_{0.7}P_{0.2}Te_{0.25}O_{55.4}(SiO_2)_{40}$ (atomic ratio) was prepared in accordance with the method of Example 1-2.

The catalysts of the above examples and comparative examples were subjected to the catalyst activity test as mentioned above. The results are shown in Table 1.

INDUSTRIAL APPLICABILITY

The catalysts of the present invention can give a high yield of unsaturated nitriles by ammoxidation of olefins, especially acrylonitrile by ammoxidation of propylene, and besides they can inhibit combustion of ammonia.

TABLE 1

| | Catalyst composition (atomic ratio) | | | | | | | | | | | |
|---|---|---|---|---|---|---|---|---|---|---|---|---|
| | Mo | Bi | Fe | Sb | Ni | Cr | F | G | H | K X | Y | $SiO_2$ |
| Example | | | | | | | | | | | | |
| 1-1 | 10 | 0.3 | 4.4 | 4.2 | 5.75 | 0.5 | Zr 0.2 | — | — | 0.7 P 0.2 Te 0.25 | — | 40 |
| 1-2 | 10 | 0.3 | 4.4 | 4.2 | 5.75 | 0.5 | Zr 0.2 | — | — | 0.7 P 0.2 Te 0.25 | — | 40 |
| 2-1 | 10 | 0.3 | 4.5 | 7.0 | 5.75 | 0.7 | La 0.2 | — | V 0.05 | 0.7 P 0.2 Te 0.25 | — | 40 |
| 2-2 | 10 | 0.3 | 4.5 | 7.0 | 5.75 | 0.7 | La 0.2 | — | V 0.05 | 0.7 P 0.2 Te 0.25 | — | 40 |
| 3 | 10 | 0.4 | 4.5 | 10.0 | 5.75 | 1.0 | Ce 0.2 | — | Ta 0.05 | 0.5 P 0.2 | Cs 0.1 | 40 |
| 4-1 | 10 | 0.4 | 0.6 | — | 5.75 | 0.5 | Zr 0.2 | — | — | 0.7 P 0.2 Te 0.25 | — | 40 |
| 4-2 | 10 | 0.4 | 0.6 | — | 5.75 | 0.5 | Zr 0.2 | — | — | 0.7 P 0.2 Te 0.25 | — | 40 |
| 5 | 10 | 0.4 | 0.6 | — | 5.75 | 1.5 | La 0.2 | Mn 0.2 | — | 0.7 P 0.2 Te 0.25 | — | 40 |
| 6 | 10 | 0.8 | 4.5 | 4.0 | 6.50 | 0.6 | Zr 0.1 La 0.1 | — | — | 0.7 P 0.5 B 0.3 | — | 40 |
| 7 | 10 | 1.0 | 4.5 | 4.0 | 6.00 | 0.5 | Zr 0.1 | Zn 0.2 | Nb 0.05 | 0.6 P 0.5 Te 0.25 B 0.3 | — | 50 |
| 8 | 10 | 1.0 | 4.5 | 4.0 | 5.50 | 0.5 | La 0.1 | Mg 0.5 | — | 0.6 P 0.2 Te 0.25 | — | 40 |
| 9 | 10 | 1.5 | 4.5 | 4.0 | 5.00 | 0.3 | La 0.07 | Co 1.0 | — | 0.6 P 0.2 Te 0.25 | — | 40 |
| 10 | 10 | 0.4 | 4.5 | 4.0 | 7.00 | 0.4 | La 0.1 | — | W 0.1 | 0.5 P 0.5 B 0.3 | Rb 0.1 | 40 |
| 11 | 10 | 0.3 | 7.6 | 7.7 | 6.00 | 0.5 | Zr 0.1 La 0.1 | — | — | 0.6 P 0.2 | — | 60 |
| Comparative Example | | | | | | | | | | | | |
| 1 | 10 | 0.3 | 4.4 | 4.2 | 5.75 | 0.5 | — | — | — | 0.7 P 0.2 Te 0.25 | — | 40 |
| 2 | 10 | 0.3 | 4.4 | 4.2 | 5.75 | — | Zr 0.2 | — | — | 0.7 P 0.2 Te 0.25 | — | 40 |
| 3 | 10 | 0.3 | 4.4 | 4.2 | 5.75 | — | Ce 0.2 | — | — | 0.7 P 0.2 Te 0.25 | — | 40 |

| Reaction Conditions | | | | | | |
|---|---|---|---|---|---|---|
| Calcining Temperature °C. | Reaction Temperature °C. | Contact Time sec | Yield of AN[1] % | Conversion of C3[2] % | Selectivity AN[3] % | Combustion Rate of $NH_3$ % |

TABLE 1-continued

| Example | | | | | | | |
|---|---|---|---|---|---|---|---|
| 1-1 | 590 | 440 | 2.25 | 84.5 | 98.5 | 85.9 | 11 |
| 1-2 | 590 | 440 | 2.25 | 85.7 | 98.5 | 87.0 | 10 |
| 2-1 | 590 | 435 | 2.50 | 84.5 | 98.5 | 85.7 | 9 |
| 2-2 | 590 | 435 | 2.50 | 84.7 | 98.6 | 85.9 | 8 |
| 3 | 600 | 440 | 2.50 | 85.1 | 98.5 | 86.4 | 7 |
| 4-1 | 580 | 440 | 2.50 | 84.2 | 98.2 | 85.7 | 15 |
| 4-2 | 580 | 440 | 2.25 | 84.8 | 98.6 | 86.0 | 13 |
| 5 | 580 | 435 | 2.50 | 84.1 | 98.9 | 85.0 | 10 |
| 6 | 560 | 440 | 2.50 | 84.2 | 98.1 | 85.8 | 12 |
| 7 | 560 | 440 | 2.50 | 83.9 | 98.0 | 85.6 | 11 |
| 8 | 555 | 440 | 2.25 | 84.1 | 98.8 | 85.1 | 10 |
| 9 | 535 | 440 | 2.25 | 83.9 | 98.5 | 85.2 | 16 |
| 10 | 600 | 440 | 3.00 | 85.5 | 98.3 | 87.0 | 6 |
| 11 | 590 | 440 | 2.50 | 85.6 | 98.7 | 86.7 | 9 |
| Comparative Example | | | | | | | |
| 1 | 590 | 440 | 1.50 | 82.1 | 98.3 | 83.5 | 5 |
| 2 | 550 | 440 | 1.75 | 83.1 | 98.5 | 84.4 | 18 |
| 3 | 570 | 440 | 2.50 | 83.6 | 98.6 | 84.8 | 25 |

Note)
[1] AN: Acrylonitrile
[2] C3: Propylene

What is claimed is:

1. A catalyst composition represented by the following empirical formula which is useful in production of unsaturated nitriles by ammoxidation:

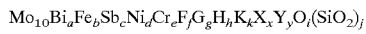

wherein Mo, Bi, Fe, Sb, Ni, Cr and K represent molybdenum, bismuth, iron, antimony, nickel, chromium and potassium, respectively, F represents at least one element selected from the group consisting of zirconium, lanthanum and cerium, G represents at least one element selected from the group consisting of magnesium, cobalt, manganese and zinc, H represents at least one element selected from the group consisting of vanadium, niobium, tantalum and tungsten, X represents at least one element selected from the group consisting of phosphorous, boron and tellurium, Y represents at least one element selected from the group consisting of lithium, sodium, rubidium and cesium, O represents oxygen and $SiO_2$ represents silica, the suffixes a, b, c, d, e, f, g, h, i, j, k, x and y represent a ratio of atoms or atomic groups, a=0.1–3, b=0.3–15, c=0–20, d=3–8, e=0.2–2, f=0.05–1, e/f>1, g=0–5, h=0–3, k=0.1, x=0–3, y=0–1, i is the number of oxygen produced by bonding of the above respective components, and j=0–100.

2. A catalyst composition according to claim 1 which contains iron antimonate.

3. A catalyst composition according to claim 1 or 2, wherein said metal oxide catalyst is a fluidized bed catalyst prepared by spray drying an aqueous slurry having a pH of 6 or higher and containing at least starting materials for molybdenum, bismuth and iron components and a chelating agent and calcining the resulting product.

4. A method for producing the catalyst composition of claim 1 or 2 which comprises mixing an aqueous slurry having a pH of 6 or higher and containing at least a part of a starting material for molybdenum and a starting material for at least one element selected from the group consisting of nickel, cobalt, magnesium, chromium, manganese and zinc with a solution or slurry containing a starting material for tellurium or a starting material for iron, and drying and calcining the mixture.

5. A method for producing the catalyst composition of claim 1 or 2 which comprises heat treating an aqueous slurry having a pH of 6 or higher and containing at least a part of a starting material for molybdenum and a starting material for at least one element selected from the group consisting of nickel, cobalt, magnesium, chromium, manganese and zinc at a temperature of 50–120° C. for at least 10 minutes, mixing a starting material for tellurium or a starting material for iron with said heat treated slurry, and then drying and calcining the mixture.

6. A method for producing the catalyst composition of claim 1 or 2 which comprises mixing an aqueous slurry having a pH of 6 or higher and containing at least a part of a starting material for molybdenum and a starting material for at least one element selected from the group consisting of nickel, cobalt, magnesium, chromium, manganese and zinc with a solution or slurry containing a starting material for tellurium and a starting material for iron, and drying and calcining the mixture.

7. A method for producing the catalyst composition of claim 1 or 2 which comprises heat treating an aqueous slurry having a pH of 6 or higher and containing at least a part of a starting material for molybdenum and a starting material for at least one element selected from the group consisting of nickel, cobalt, magnesium, chromium, manganese and zinc at a temperature of 50–120° C. for at least 10 minutes, mixing a starting material for tellurium and a starting material for iron with said heat treated slurry, and then drying and calcining the mixture.

8. A catalyst composition according to claim 1, wherein j=20–80.

9. A process for producing an unsaturated nitrile comprising ammoxidating an olefin in the presence of a catalyst composition according to claim 1.

10. A process for producing an unsaturated nitrile comprising ammoxidating an olefin in the presence of a catalyst composition according to claim 2.

* * * * *